July 13, 1926. 1,592,791
E. P. WEBSTER
CEREAL DEPOSITING AND BAKING MACHINE
Original Filed May 11, 1922   10 Sheets-Sheet 7
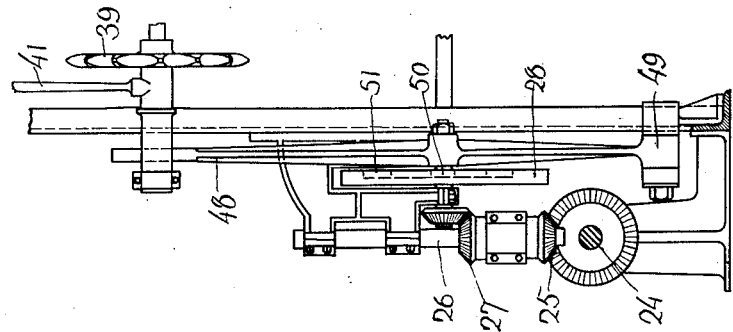
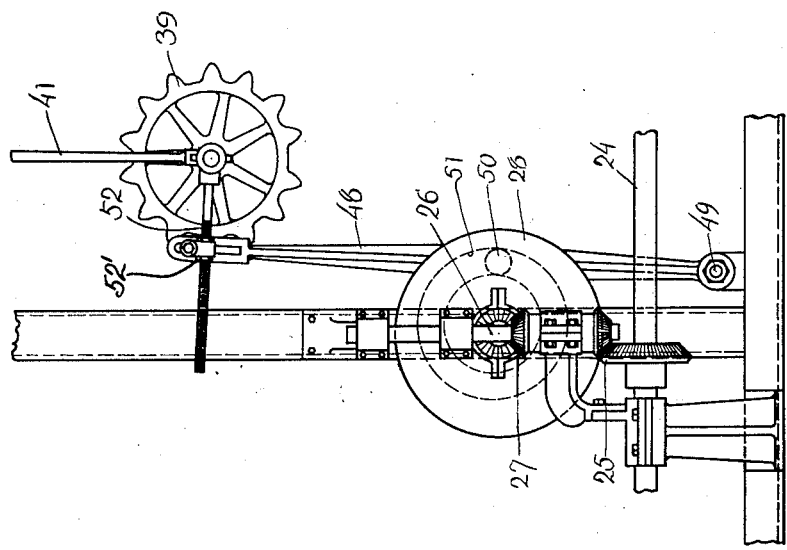
INVENTOR
E. P. Webster.
BY
E. D. Anderson Jr.
ATTORNEYS

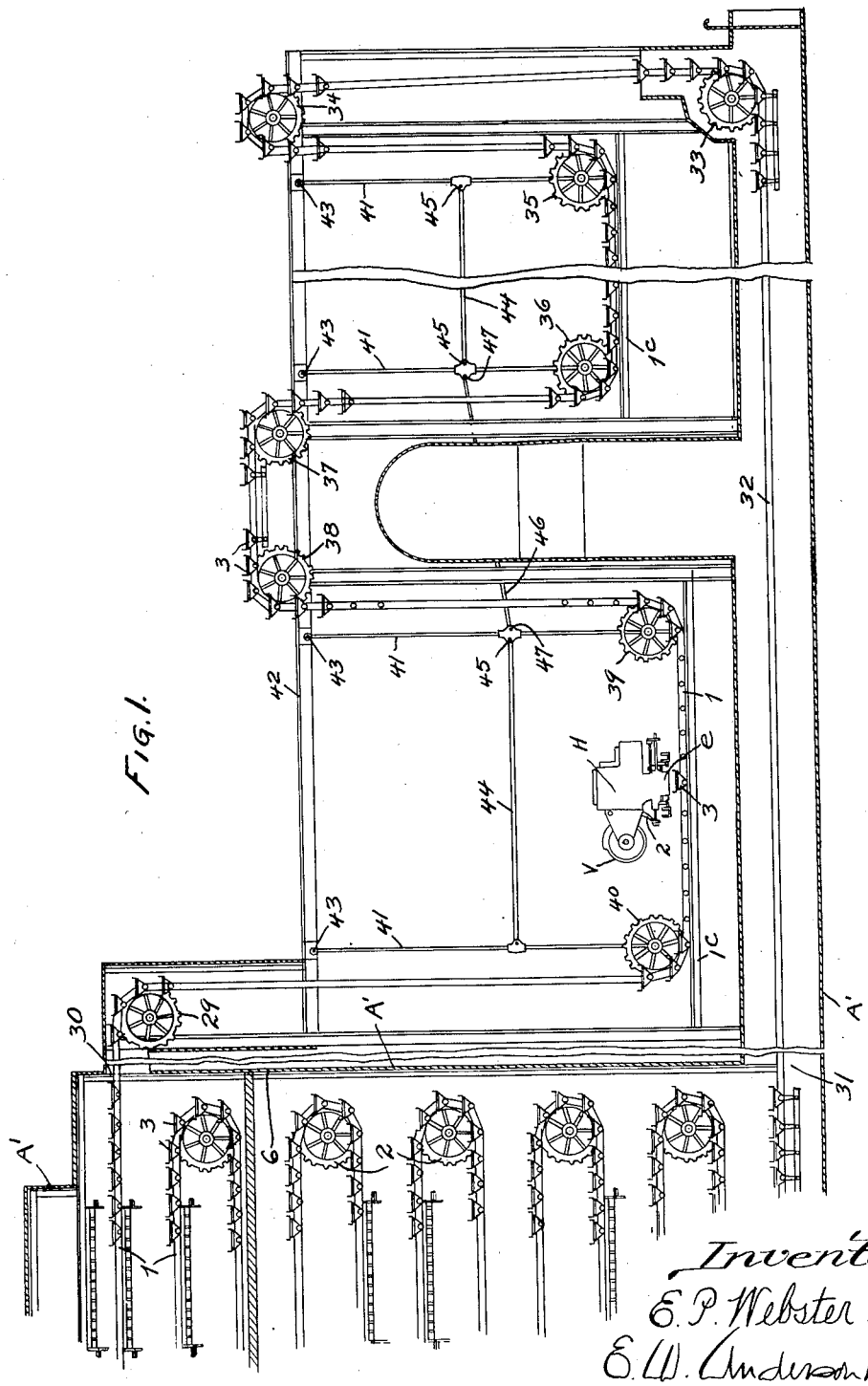

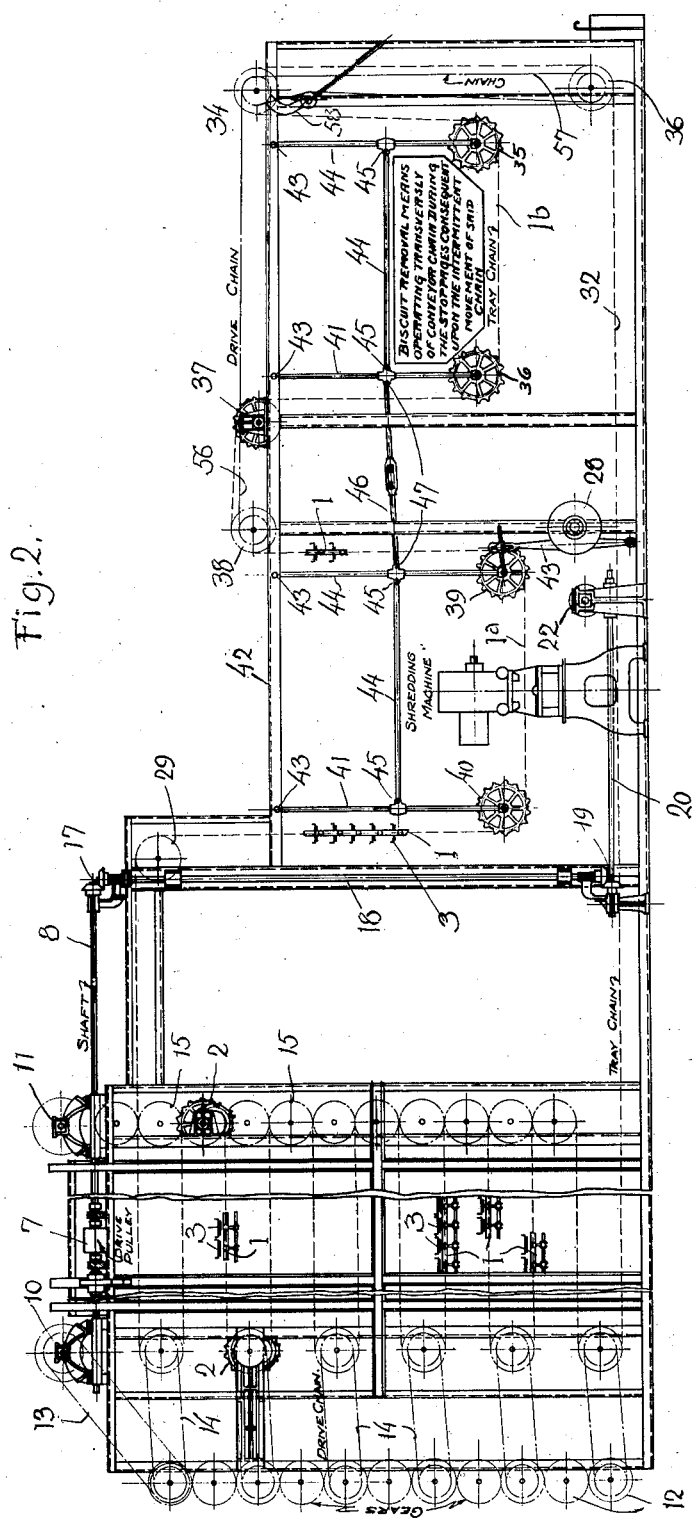

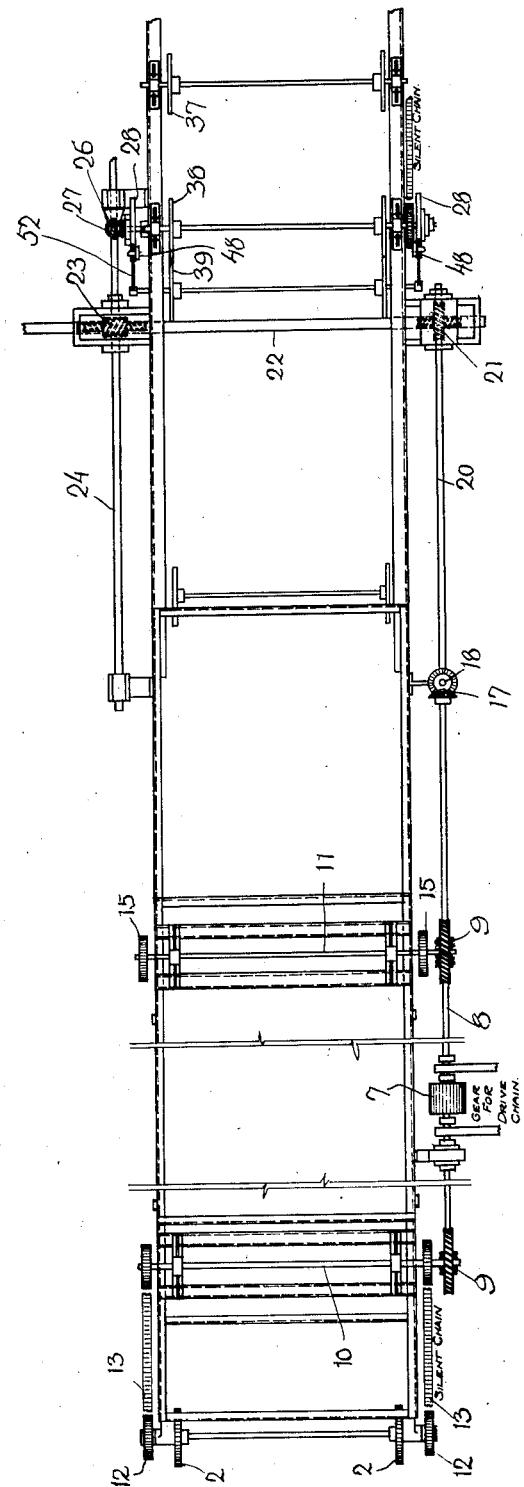

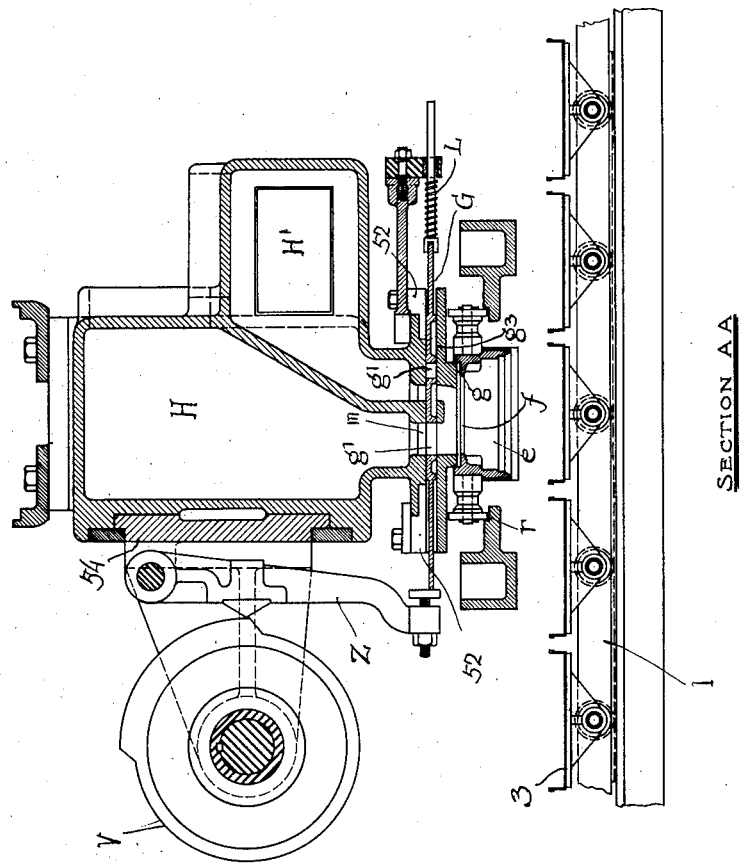

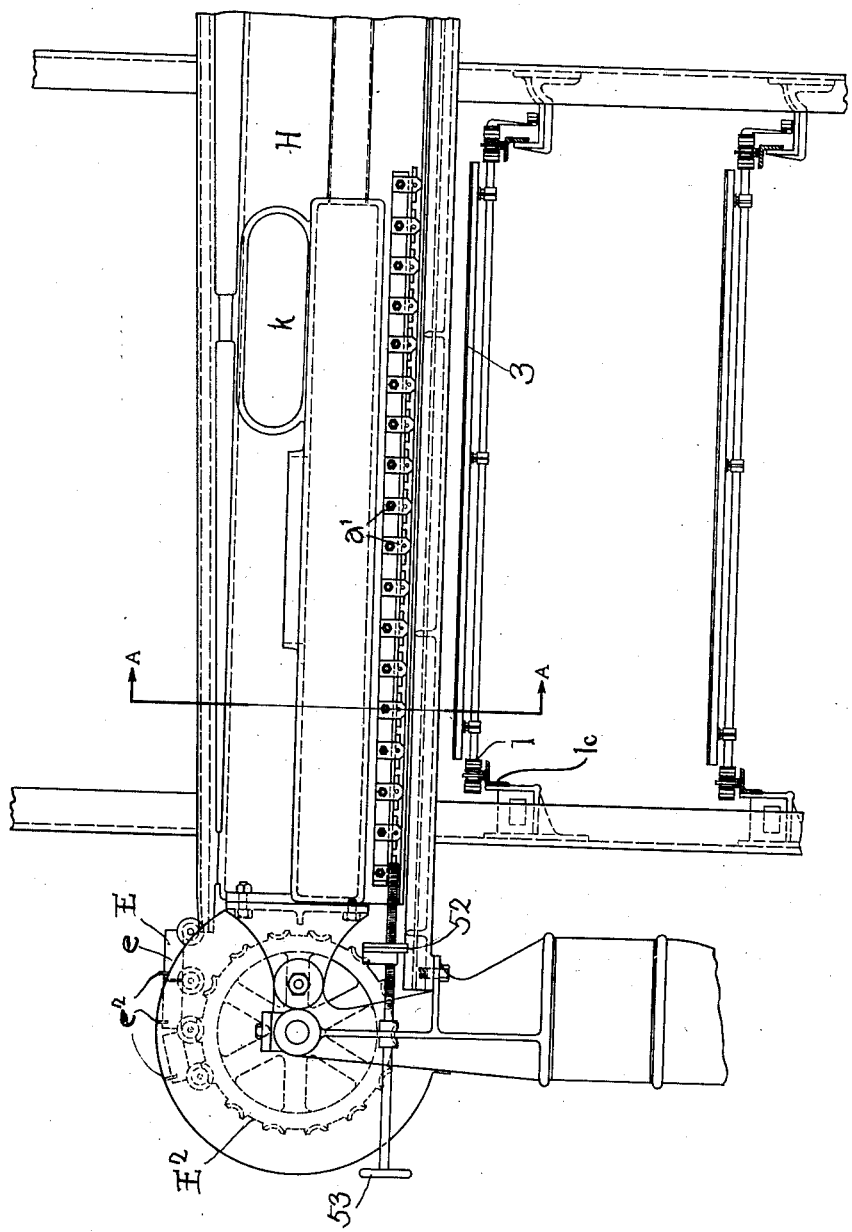

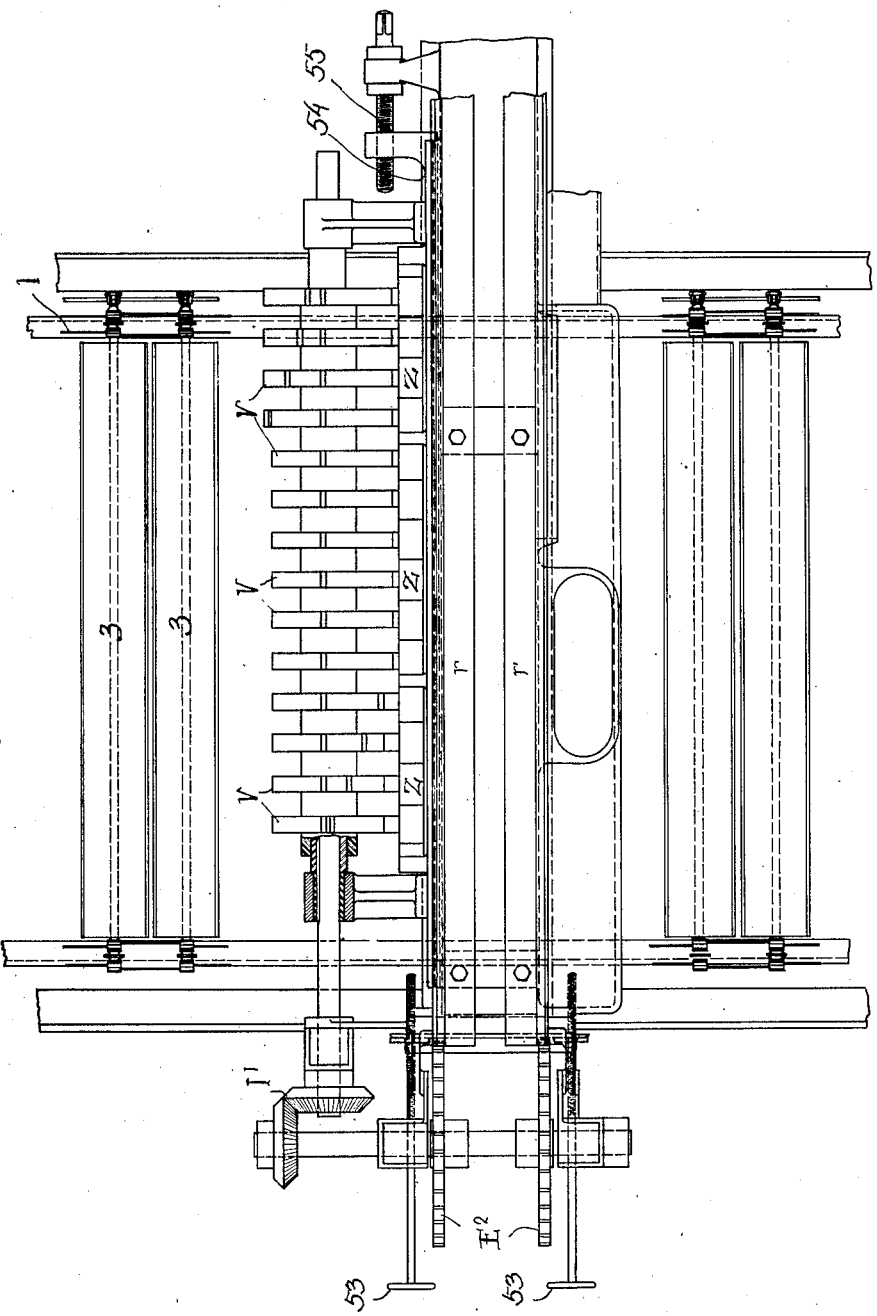

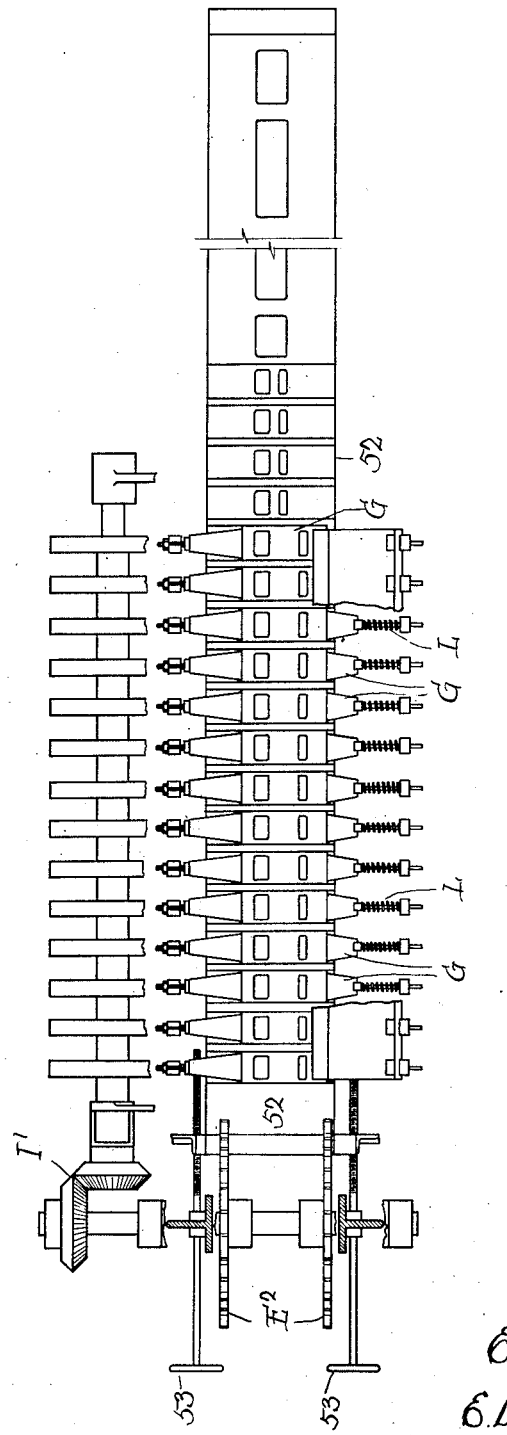

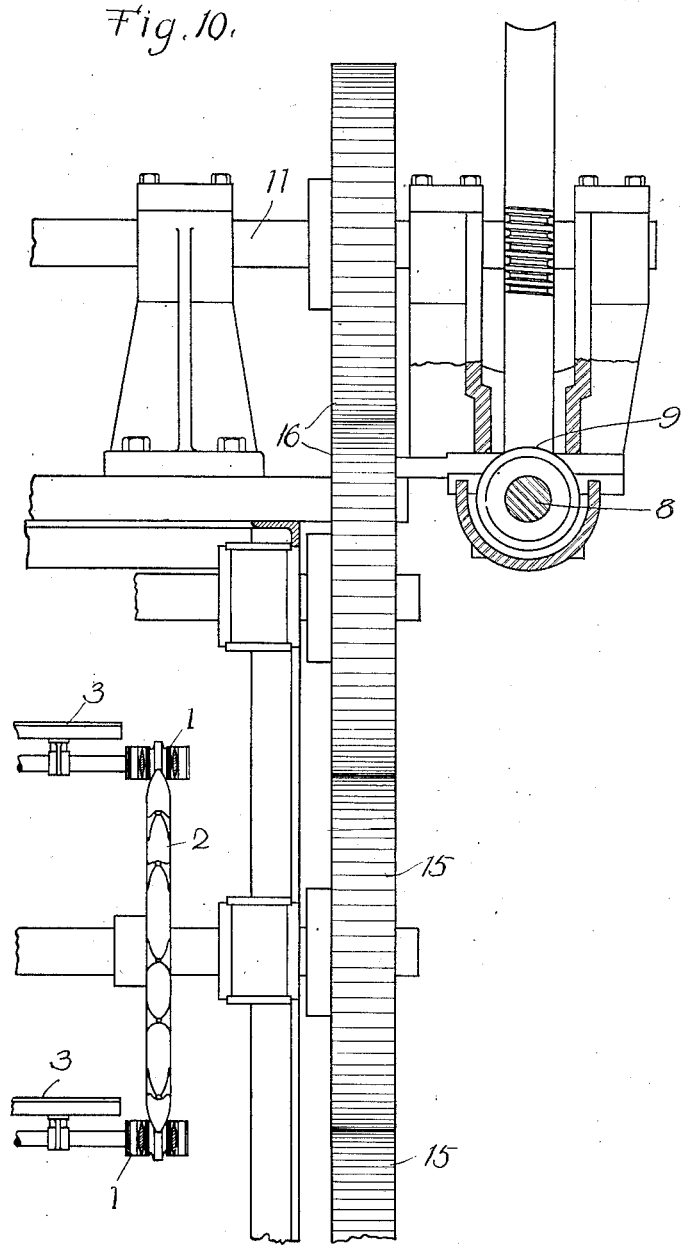

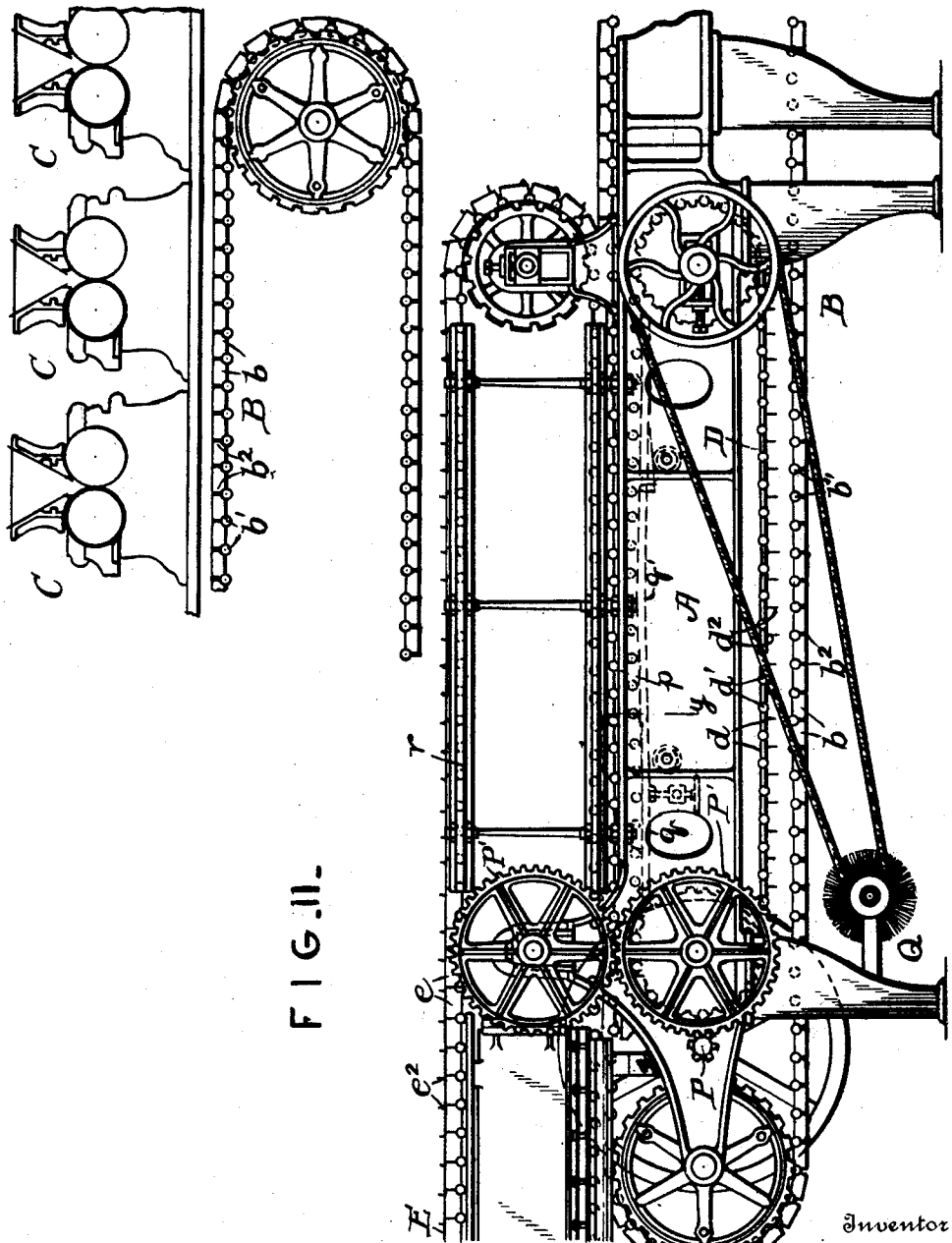

Patented July 13, 1926.

1,592,791

UNITED STATES PATENT OFFICE.

EARL P. WEBSTER, OF NIAGARA FALLS, NEW YORK, ASSIGNOR TO THE SHREDDED WHEAT COMPANY, OF NIAGARA FALLS, NEW YORK, A CORPORATION OF NEW YORK.

CEREAL DEPOSITING AND BAKING MACHINE.

Application filed May 11, 1922, Serial No. 560,134. Renewed May 11, 1926.

This invention relates to apparatus for manufacturing food products, and is particularly adapted for the manufacturing of cereal filamentous biscuits of the shredded real wheat type. The invention is more particularly concerned with the provision of a machine by which biscuits may be continuously formed from the cereal grain, deposited in the pans or trays of a baking conveyor which carries the biscuits into, through, and out of an oven, the biscuits being removed from the trays after being baked and dried in the oven and delivered to machines by which they are packed in selected quantities in cartons.

One embodiment of the invention includes shredding devices which receive the grain and deposit it in the form of a continuous strand upon a conveyor. The conveyor carries the strand away from the shredding devices as rapidly as it is formed and in its movement the strand is divided into individual biscuits. These biscuits are removed from the conveyor by a depositing device which carries them out over the pans of an endless baking conveyor. The pans of the latter come successively to rest beneath the depositing mechanism, and as each pan is brought to position, a row of biscuits is deposited on it, this row extending transversely of the baking conveyor. In order that the biscuits may be deposited on the pans of the baking conveyor while the latter is moved intermittently, mechanism is provided by which only a portion of the baking conveyor is given a step by step movement of advance, the remainder traveling with a substantially continuous movement. This mechanism includes means for guiding a portion of the conveyor outside the oven through a loop, and means for swinging the loop so that the pans traveling through the looped portion move with a step by step movement past the depositing means. In order that the biscuits deposited in the pans may be properly positioned transversely of the baking conveyor, the depositing means is provided with adjustment devices so that the row of biscuits may be deposited in different positions, as may be required, and similarly, adjustment devices are provided by which the position of the pans lengthwise of the conveyor may be regulated so that as each pan is brought to rest it is directly beneath the depositing mechanism.

For a better understanding of the invention, reference will be made to the accompanying drawings, in which,—

Figure 1 is a side view, partly in section, and partly broken away, of the invention.

Figure 2 is a similar view on a smaller scale and including parts of the invention not shown in Figure 1.

Figure 3 is a plan view of the invention, partly broken away.

Figure 4 is a section on the line A—A, Figure 5.

Figure 5 is a detail side vew of the depositing means of the invention, partly broken away.

Figure 6 is a detail plan view of the same.

Figure 7 is a detail side view of a portion of the means for imparting reciprocatory movement to the conveyor chain loops.

Figure 8 is a detail edge view of the same.

Figure 9 is a detail plan view of the depositing means with parts removed showing the manner in which the valve plates are carried by the adjustable slide.

Figure 10 is a detail end view of the drive connection with one of the upper transverse shafts.

Figure 11 is a side elevation of a machine, partly broken away, showing means for depositing the cereal band upon the conveyor, and for dividing said band transversely into biscuit.

Referring now to the drawings, the machine as illustrated includes shredding devices C (Fig. 11) which receive the cereal grain after it has been given a preliminary cooking treatment. These shredding devices shred the grain and deposit it in the form of a strand made up of a plurality of filaments upon a conveyor B which is provided with links $b$ connected by rollers $b'$. The links $b$ are separated to provide spaces $b^2$ between them. Within the loop of the conveyor B is a cutter chain D, provided with links $d$ and rollers $d'$, the links carrying cutter blades $d^2$. An upper chain E is also provided, made up of links $e$ pivotally connected and carrying cutter blades $e^2$. The upper chain passes over a track $r$ and beneath a track $y$, while the lower cutter chain passes over tracks $q$. The two cutter chains are placed close together on either side of a stretch of the conveyor B, and as the latter passes between the two chains carrying the strand, the cutter blades of the chains enter the spaces $b^2$ between adjacent links of the conveyor chain and divide the strand into individual biscuits.

The upper cutter chain projects out beyond the end of the conveyor chain and the links of this cutter chain are made hollow (Fig. 4). The links in the lower stretch of the cutter chain pass beneath a depositing device, including a vacuum chamber H and a compression chamber H', and these chambers have slots in their lower faces, as at $m$ by which they communicate with the interior of the links. Each link has a perforated face so that when the links are in communication with the chamber H through the slot $m$ a suction is exerted on the face of each link. Placed lengthwise of the chambers H, H', is a series of valve plates G, provided with openings $g'$. These plates run in suitable guide-ways $g^3$ in a slide 52 and each plate has an extension L surrounded by a spring which forces the plate toward the left, as shown in Fig. 4. The spring bears at one end against a guide formed as an extension of the slide 52.

Each plate is actuated by a rocker arm Z which is engaged by an arm V on a shaft mounted in brackets extending lengthwise of a slide 54, and the arrangement of the cams is such that as the conveyor B moves along with a succession of individual biscuits mounted on it, these biscuits are picked up by the links in the lower stretch of chain E, the links at that time being connected to the suction chamber H. The biscuits are held against the lower faces of the links and carried with the links out over the pans of a baking conveyor until the row of biscuits carried by the links extends the full length of the pan. Thereupon the cams V simultaneously operate all the lever arms Z to cause the vacuum chamber to be cut off from the links and the compression chamber to be put in communication with them. This substitution of compression for vacuum causes the row of biscuits held against the lower faces of the links to be deposited as a group upon a tray of the baking conveyor.

In order that the row of biscuits may be properly centralized with reference to the pans, the valve plates $g$ are movable with the slide 52 and the slide and the entire series of valve plates are adjustable by means of screws 53, one screw being placed at each side of the machine so that the adjustment may be easily accomplished. Similarly, the entire series of operating cams V and arms Z mounted on the slide 54 are adjustable by means of a screw 55 which permits of alteration of the position of the cams and rocker arms.

The baking conveyor, generally designated B, is in the form of an endless chain and carries transverse pans or trays 3. This conveyor receives biscuits from the depositing mechanism, and carries them into, through, and out of an oven enclosure 6. The baking conveyor passes through the oven in a succession of horizontal stretches which are guided by sprocket wheels 2, and the construction of the conveyor chain is such that the trays are always maintained in upright position. Owing to the great length of the conveyor and its weight, it is impossible to move it as a whole with an intermittent movement, such as is desirable in the depositing of the biscuits upon the conveyor trays. Accordingly, only a portion of the conveyor is given an intermittent movement, while the remainder advances with a substantially continuous movement. For this purpose, the conveyor which extends horizontally out of the oven for some distance, as indicated at 32, passes upwardly around a sprocket wheel 36, around a sprocket wheel 34, and downwardly through a sprocket wheel 35, thence in a horizontal stretch to a sprocket wheel 36. Passing around the sprocket wheel 36, the chain extends upwardly to a sprocket wheel 37, thence horizontally to a sprocket wheel 38, around the latter and downwardly around the sprocket wheel 39. The chain then extends horizontally to a sprocket wheel 40 and then upwardly around a sprocket wheel 29, whence it passes horizontally into the oven near the top of the latter.

It will be observed that the portion of the chain outside the oven is formed in two loops, the lower ends of the loops being defined by sprocket wheels 35 and 36 and 39 and 40. It is to be understood that the conveyor chain is double and the sprocket wheels are arranged in pairs. Each of the sprocket wheels 35, 36, 39, and 40 is carried in the lower end of a suspension rod 41, pivotally mounted to a framework 42 at 43. The rods 41 are connected by a cross bar 44 pivotally secured thereto at 45 and an adjustable connection link 46 is connected to adjacent rods 41 at 45. The conveyor chain extends between sprocket wheels 35 and 36 in a horizontal stretch $1^b$ and between sprocket wheels 39 and 40 in a horizontal stretch $1^a$, these stretches being supported on horizontal tracks $1^c$. The pans in the stretch $1^a$ pass beneath the depositing mechanism and receive charges of biscuits in the successive operations of mechanism.

In order to give the pans in the horizontal stretch of the conveyor loops a step by step movement, there is provided a rock lever 48 fulcrumed at its lower end at 49 and having a pin 50 engaging an eccentric track 51 in a disc 28, this disc being driven by a bevel gear connection 27 from a shaft 26 driven through a bevel gear connection 25 by horizontal shaft 24. The rock lever 48 is connected by an adjustable link connection 52 with the shaft on which is mounted the sprocket wheel 39 and as the rock lever 48 reciprocates, the sprocket wheels 35, 36, 39, and 40, through the connections between the suspension rods, are swung about the centers 43 with a rocking movement. The extent of this movement is such that at each reciprocation of the rock lever in a direction opposite to that in which the conveyor chain is moving, a single link carrying a pan in the downward vertical stretch of each loop is moved into the horizontal stretch, and a link carrying a pan at the end of the horizontal stretch passes upwardly into the upwardly moving vertical stretch of each loop, while the pans in the horizontal stretches remain at rest. In the movement of the rock lever 48 in the direction of movement of the conveyor, the horizontal stretches are advanced to the extent of one link and accordingly the pans in the horizontal stretch are moved step by step through this stretch. At each period of rest in this movement, a pan is brought beneath the depositing mechanism and receives a charge of biscuits.

In order that the pans may come to rest exactly beneath the depositing mechanism, the operating connection 52 has a screw adjustment means 52′ so that the loops of the baking conveyor may be adjusted pivotally with respect to the upper ends of the suspension rods 41 as centers. This adjustment varies the position of the trays longitudinally with respect to the horizontal stretches of the loop and transversely with respect to the biscuit depositing means. By such adjustment may be exactly positioned so that the biscuits will be properly deposited in them.

The conveyor chain 1 is driven by a drive pulley 7 operating a drive shaft 8, the latter having worm connections 9 with transverse shafts 10 and 11. A vertical series of spur gears 12 meshing with each other, is provided, the uppermost gear of the series being driven by a chain 13 from the shaft 10 and certain of these gears having drive connections 14 with sprocket wheels 2 around which the conveyor chain within the oven extends. Spur gears 15, also in mesh with each other, are driven through a connection 16 (not shown) from transverse shaft 11, certain of these gears being connected to sprocket wheels 2 at the other end of the oven.

The drive shaft 8 has a bevel gear connection 17 with vertical shaft 18 and drives the horizontal shaft 20 through bevel gears 19. The shaft 20 has a worm gear connection 21 with a transverse shaft 22. The shaft 22 has a worm gear connection 23 with a horizontal shaft 24 which has a bevel gear connection 25 with the shaft 26.

It will be observed that with the mechanism described, the cereal grain is continuously formed into a strand of filaments deposited on a conveyor, the strands being divided into individual biscuits as it is carried along on the conveyor. The biscuits are picked up by a depositing mechanism which carries them out over the pans of a baking conveyor and as the pans are brought intermittently to rest upon the depositing means, the latter operates to deposit a row of biscuits in each pan. The baking conveyor carries the biscuits into, through, and out of the oven, wherein the biscuits are baked, and if desired dried, so as to be ready for packing. The baking conveyor has a continuous movement as a whole, but portions of the conveyor are given a step by step movement so that the pans in the portions thus intermittently moved are brought to rest beneath the depositing means. The depositing means is provided with adjustment devices so that the row of biscuits which it deposits at each operation may be properly centralized in the pan, this adjustment being transverse with respect to the baking conveyor. The portions of the baking conveyor which are intermittently advanced are also capable of adjustment so that the pans may be moved to different positions longitudinally of the conveyor or transversely with respect to the depositing means. By such adjustment devices, the exact centering of the rows of biscuits in the pans may readily be accomplished so that no damage will result to the uncooked biscuits during the depositing operation.

I claim:

1. In a cereal depositing and baking machine, an oven, a baking conveyor passing through the oven, means for depositing successive transverse rows of biscuit upon the baking conveyor, and means for adjusting the depositing means relative to the baking conveyor to centralize the deposit of the biscuit thereon.

2. In a cereal depositing and baking machine, a conveyor, an oven, a baking conveyor passing through the oven and having trays and having a path of movement at right angles to that of the first named conveyor, means for depositing successive transverse rows of biscuit upon the baking conveyor from the first named conveyor, and means for adjusting the depositing means relative to the baking conveyor to centralize the deposit of the biscuit thereon.

3. In a cereal depositing and baking machine, an oven, a baking conveyor passing through the oven and having trays, means for depositing successive transverse rows of biscuit upon the trays of the baking conveyor, and means for adjusting the baking conveyor and its trays transversely relative to the depositing means.

4. In a cereal depositing and baking machine, a conveyor, an oven, a baking conveyor passing through the oven and having trays and a path of movement at right angles to the path of movement of the first named conveyor, means for depositing successive transverse rows of biscuit upon the trays of the baking conveyor from the first named conveyor, and means for adjusting the baking conveyor and its trays transversely relative to the first named conveyor and said depositing means.

5. In a cereal depositing and baking machine, an oven, a baking conveyor passing through the oven and provided with trays and having a loop therein provided with pivoted suspension rods, means for depositing successive transverse rows of biscuit upon the baking conveyor, and means for adjusting said loop pivotally from the upper ends of said suspension rods as centers to adjust said trays relative to the depositing means.

6. In a cereal depositing and baking machine, a conveyor, an oven, a baking conveyor passing through the oven and having trays, means for intermittently depositing successive transverse rows of biscuit upon the baking conveyor from the first named conveyor and means for moving the baking conveyor continuously through the oven and intermittently past the depositing means including a loop in the baking conveyor having pivoted suspension rods and means for reciprocating said loop, and means for adjusting said loop pivotally from the upper ends of said rods as centers to adjust said trays relative to the depositing means.

7. In a cereal depositing and baking machine, an oven, a baking conveyor passing through the oven and having trays, means for depositing successive transverse rows of biscuit upon the trays of the baking conveyor, means for adjusting the depositing means relative to the baking conveyor, and means for adjusting the baking conveyor and its trays relative to the depositing means.

8. In a cereal depositing and baking machine, a conveyor, an oven, a baking conveyor passing through the oven and having trays, and a path of movement at right angles to that of the first named conveyor, and having a loop therein provided with pivoted suspension rods, means for depositing successive transverse rows of biscuit upon the baking conveyor from the first named conveyor, means for adjusting the depositing means relative to the baking conveyor, and means for adjusting said loop pivotally from the upper ends of said rods as centers to adjust said trays relative to said depositing means.

9. In a cereal depositing and baking machine, an oven, a baking conveyor passing through the oven and having trays, means for depositing successive transverse rows of biscuit upon the said trays, and means for adjusting the depositing means and the baking conveyor relatively to each other to longitudinally and transversely centralize the rows of biscuit upon the trays.

10. In a cereal depositing and baking machine, an oven, a baking conveyor passing through the oven and having trays, means for depositing successive transverse rows of biscuit upon said trays, means for adjusting the depositing means relative to said conveyor to longitudinally centralize the rows of biscuit deposited upon the trays, and means for adjusting the baking conveyor and its trays relative to the depositing means to transversely centralize the rows of biscuit upon the trays.

11. In a cereal depositing and baking machine, a conveyor, an oven, a baking conveyor passing through the oven and having trays and a path of movement at right angles to that of the first named conveyor, means for depositing successive transverse rows of biscuit upon the baking conveyor from the first named conveyor, means for adjusting the depositing means relative to the baking conveyor to longitudinally centralize the rows of biscuit upon the trays, and means for adjusting the baking conveyor and its trays relative to the depositing means to transversely centralize the rows of biscuit upon the trays.

12. In a cereal depositing and baking machine, a conveyor, an oven, a baking conveyor passing through the oven, means for depositing successive transverse rows of biscuit upon the baking conveyor from the first named conveyor including a series of valve plates and a series of operating arms and cam devices, means for simultaneously adjusting the entire series of valve plates, and means for simultaneously adjusting the entire series of operating arms and cam devices relative to the baking conveyor.

13. In a cereal depositing and baking machine, a conveyor, an oven, a baking conveyor passing through the oven, means for depositing successive transverse rows of biscuit upon the baking conveyor from the first named conveyor including a series of valve plates and a series of operating arms and cam devices, means for simultaneously adjusting the entire series of valve plates and means for simultaneously adjusting the entire series of operating arms and cam devices including slides carrying the same and operating screws therefor.

14. In a cereal depositing and baking machine, a conveyor chain, an oven, a baking conveyor passing through the oven and including trays, means for depositing successive transverse rows of biscuit upon the baking conveyor from the links of said conveyor chain, and operating means for the conveyors adapted for adjustment of said trays relative to said links including a loop in the baking conveyor having suspension rods and sprocket wheels in the bends of the loop, and means for imparting reciprocatory movement to said loop including an eccentric and a lever operated thereby and having adjustable screw connection with one of said rods.

15. In a cereal depositing and baking machine, a conveyor, an oven, a baking conveyor passing through the oven and including trays, means for depositing successive transverse rows of biscuit upon the baking conveyor from the first named conveyor and adjustable relative to the baking conveyor to centralize the deposit of biscuit thereon, and operating means for the conveyors adapted for adjustment of said trays relative to the depositing means.

16. In a cereal depositing and baking machine, a conveyor chain, an oven, a baking conveyor passing through the oven and including trays, means for depositing successive transverse rows of biscuit upon the baking conveyor from the links of said conveyor chain including a series of valve plates and a series of operating arms and cam devices, operating means for the conveyors adapted for adjustment of said trays relative to said links, means for simultaneously adjusting the entire series of valve plates, and means for simultaneously adjusting the entire series of operating arms and cam devices.

17. In a cereal depositing and baking machine, a conveyor chain, an oven, a baking conveyor passing through the oven and including trays, means for depositing successive transverse rows of biscuit upon the baking conveyor from the links of said chain including a series of valve plates and a series of operating arms and cam devices, operating means for the conveyors adapted for adjustment of said trays relative to said links including a loop in the baking conveyor having suspension rods and sprocket wheels in the bends of the loop, means for imparting reciprocatory movement to said loop including an eccentric and a lever operated thereby and having adjustable screw connection with one of said suspension rods, means for simultaneously adjusting the entire series of valve plates and means for simultaneously adjusting the entire series of operating arms and cam devices including slides carrying the same and operating screws therefor.

18. In a baking machine, the combination of an oven, a baking conveyor passing through the oven and carrying trays, a portion of the conveyor outside the oven forming a loop, means for depositing articles to be baked upon the successive trays in the loop, and means for adjusting the position of the trays in the loop relative to the depositing means and in a direction lengthwise of the conveyor.

19. In a baking machine, the combination of an oven, a baking conveyor passing through the oven and provided with trays for carrying articles to be baked, a portion of the conveyor outside the oven forming a loop, means for depositing articles to be baked upon successive trays in the loop, this depositing means extending transversely to the conveyor, and means for adjusting the position of the depositing means in a direction transverse to the conveyor to center the articles in the trays.

20. In a baking machine, an oven, a baking conveyor passing through the oven and provided with trays for carrying articles to be baked, a portion of the conveyor outside the oven forming a loop having a horizontal stretch, means for advancing the conveyor with a continuous movement as a whole and for advancing the horizontal stretch of the conveyor with a step by step movement, means for depositing biscuits in trays in the loop brought to rest successively beneath the depositing means, and means for adjusting the position of rest of the said trays with reference to the depositing means.

21. In a baking machine, an oven, a baking conveyor passing through the oven and provided with trays for carrying articles to be baked, a portion of the conveyor outside the oven forming a loop having a horizontal stretch, means for advancing the conveyor with a continuous movement as a whole and for advancing the horizontal stretch of the conveyor with a step by step movement, means for depositing biscuits in rows in the trays brought successively to rest beneath the depositing means, means for adjusting the position of rest of said trays with reference to the depositing means, and means for adjusting the depositing means in a direction transversely of the baking conveyor, the two adjustment means permitting the deposited articles to be centered in the trays.

22. In a baking machine, an oven, a baking conveyor passing through the oven and provided with trays for carrying articles to be baked, a portion of the conveyor outside the oven forming a loop having a horizontal stretch, means for advancing the conveyor with a continuous movement as a whole and for advancing the horizontal stretch of the conveyor with a step by step movement, means for depositing biscuits in rows in the trays brought successively to rest beneath the depositing means, and means for adjusting the depositing means and the loop of the baking conveyor relative to each other to longitudinally and transversely centralize the articles upon the trays.

In testimony whereof I affix my signature.

EARL P. WEBSTER.